UNITED STATES PATENT OFFICE.

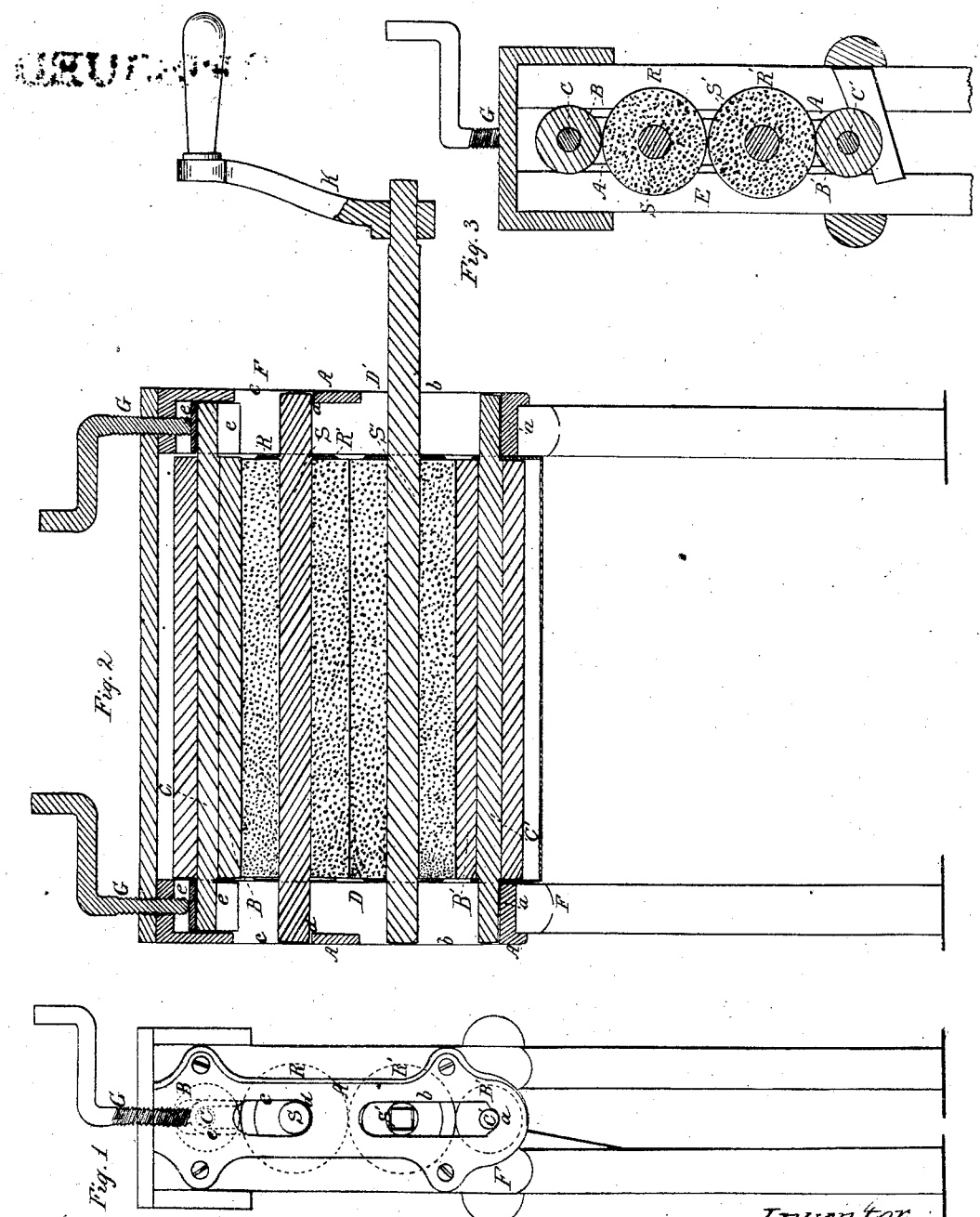

ELLIOT DICKERMAN, OF RICHMOND, VERMONT.

CLOTHES-WRINGER.

Specification forming part of Letters Patent No. 27,781, dated April 10, 1860; Reissued January 8, 1861, No. 1,119.

REISSUED

*To all whom it may concern:*

Be it known that I, ELLIOT DICKERMAN, of Richmond, in the county of Chittenden and State of Vermont, have invented a new and useful Improvement in Clothes-Wringers; and I do hereby declare that the following is a full, clear, and exact description of the same, reference being had to the annexed drawing, forming part of this specification, in the several figures of which similar characters of reference denote the same part.

Figure 1 is an end elevation of the wringer. Fig. 2 is a vertical section through axes of shafts. Fig. 3 is a section taken perpendicular to plane of Fig. 2.

This is an invention for using india rubber rollers for pressing water from clothes after washing so that the rollers will have the elasticity due to entire roller during the pressing operation.

In the drawing R R' are the two rubber rollers, upon shafts S S'.

B B' are two inelastic rollers, upon shafts C C'.

F is the frame of the machine with slots D D' for the reception of castings A, which hold the shafts of the rollers as will be hereinafter set forth.

The shaft of the lower inelastic roller B' rests in bearings $a$ $a$ in the lower portion of castings A. And may if desired have an elastic box under it, though this is not essential to this construction. The lower elastic roller R' rests directly on roller B'; its shaft S' being held in slots $b$ of castings A so as to have free vertical movement therein. The upper elastic roller R, rests on R' and has its shaft held by slots $c$ of casting, so as to have free vertical movement from projection $d$, upward. Roller B rests on the upper elastic roller. Its shaft within the slots of the castings. And above the shaft boxes $e$ $e$, acted on by screws G G, by which the pressure may be regulated. These boxes may have rubber or other springs suitably arranged to give additional elasticity to the system, though it is not absolutely necessary.

By this construction the rubber rollers are held between the inelastic ones, and the elasticity of the entire roller brought into action when any article is drawn through the said rollers.

The operation of the machine is as follows.—The machine is secured upon the wash tub by placing the legs astride of the edge. Power is applied to crank K, rotating the sytem. The garments are passed between rollers R R', and by the pressure thereof the water is pressed from the articles. The screws G regulate the pressure of the rollers to suit the thickness of the articles to be wrung.

By this construction the entire elasticity of the rollers are rendered available for the purposes desired, instead of the portion from the surface to shaft, where the shafts of the elastic rollers rest in bearings. This enables the work to be done with rollers of smaller size, and a consequent economy of construction.

I am aware of the use of rubber as a covering for rollers used for wringing clothes. But in all cases heretofore shown the thickness of this covering is alone available as regards elasticity. I therefore disclaim the use of rubber for such purpose broadly considered.

What I do claim and desire to secure by Letters Patent is—

The arrangement of rubber rollers R R', rigid rollers B B' and their respective shafts with the slotted frame F as described, whereby the entire elasticity of the rubber rollers is rendered available for the desired purpose.

In testimony whereof I have hereunto signed my name before two subscribing witnesses.

ELLIOT DICKERMAN.

Witnesses:
 ORLO CADY,
 MARY STEBBINS.